Oct. 28, 1958 J. E. HAWKINS 2,858,523
SEISMIC REPRODUCING AND RECORDING DEVICE
Filed April 2, 1957 2 Sheets-Sheet 1

Fig.1

INVENTOR.
James E. Hawkins
BY
Mason, Kolehmainen, Rathburn and Wyss
ATTORNEYS

Oct. 28, 1958  J. E. HAWKINS  2,858,523
SEISMIC REPRODUCING AND RECORDING DEVICE
Filed April 2, 1957  2 Sheets-Sheet 2

INVENTOR.
James E. Hawkins.
BY
Mason, Kolehmainen, Rathburn and Wyss
ATTORNEYS

United States Patent Office 2,858,523
Patented Oct. 28, 1958

2,858,523

SEISMIC REPRODUCING AND RECORDING DEVICE

James E. Hawkins, Broken Arrow, Okla., assignor to Seismograph Service Corporation, Tulsa, Okla., a corporation of Delaware Application April 2, 1957, Serial No. 650,230

14 Claims. (Cl. 340—15)

The present invention relates to an apparatus for reproducing signals from a reproducible record and recording the reproduced signals as a plurality of seismic wave traces disposed in side-by-side relationship on a permanent medium, and, more particularly, relates to apparatus for introducing so-called elevational, weathering and spread effect phase corrections during the reproducing-recording operation in order to obtain an accurate profile representative of a geological cross section of a portion of the earth's subsurface strata.

In geophysical surveys conducted for the purpose of exploring the earth's subsurface strata and interfaces, it is customary to generate elastic wave vibrations sequentially from a plurality of shot points and then to record on a reproducible record, as, for example, upon a magnetic tape, signals corresponding to vibrations received by way of reflection or refraction from the subsurface interfaces at a plurality of spaced apart, aligned seismometers or detectors which are oriented in an array located at some distance from and are arranged along a line extending through the shot points. The signals arriving at the array from each shot point are conventionally recorded on a reproducible record to produce several signal traces in side-by-side relationship with each trace representing the signals received by one of the detectors in the array. The time interval between the initial propagation of the elastic wave vibration and its arrival at each of the plurality of seismometers is then used in conjunction with known or assumed information concerning the velocities of propagation of the subsurface formations to determine the approximate configuration and location of these formations during playback of the reproducible records. In order to obtain accurate data, it is necessary, however, to introduce corrections for several factors conventionally encountered in geophysical prospecting. First, as is well known, the arrival times of the propagated waves from the shot point to the different seismometers vary in accordance with the horizontal spacings or distances between the seismometers. The time difference existing between the arrival of waves from the same shot point at the different seismometers as a result of the described spacing is termed the "spread effect" of the seismometer array.

In addition, a second error or time difference is present due to the topographic irregularities of the earth's surface which may cause a difference in elevation between the shot points and may also cause the seismometers of the array to be located at different elevations. The latter time difference is conventionally referred to as the "elevational effect" of the seismometer array. Moreover, another error or time difference exists because of localized conditions present near the earth's surface in the area adjacent to the seismometers which conditions alter the transit time of the elastic wave vibrations because of differences in the velocity of the propagated waves through the various subsurface strata. The latter difference, which is termed the "weathering effect," is usually minimized by disposing the shot points in shot holes at a depth located below the earth's weathering layer, thereby eliminating the effect of this layer at the point of propagation of the waves. However, since the detectors are located at the earth's surface, the "weathering effect" errors are still introduced by the passage of the seismic waves through the weathering layer to the detecting positions.

Therefore, in order properly to interpret the data derived from the geophysical surveys, compensation is generally made for time differences resulting from the elevational and weathering effects and from the spread effect by phase displacing the signals reproduced from the traces of the reproducible records during playback. It is conventional practice to obtain the described displacements by adjusting the position of each of the magnetic reproducing heads longitudinally of its associated signal trace by an amount corresponding to the required time correction required to compensate for the elevational, weathering and spread effects. The signals reproduced from each trace are then fed through suitable filtering apparatus of the band pass type to obtain relatively high quality signals by minimizing noise, spurious signals and the like. However, movement of the reproducing head relative to the tape introduces noise and static which is spread out over a considerable portion of the frequency spectrum and, hence, that noise which falls within the band pass of the filtering apparatus cannot be eliminated. Accordingly, it would be desirable to provide a system in which the described corrections could be made without resort to movement of the reproducing heads. Such an arrangement would not only eliminate the introduction of noise by the reproducing apparatus, but would also permit the filtering to be achieved prior to the introduction of corrections for the spread, elevational and weathering effects in order to obtain better signal to noise ratio.

It is, therefore, the principal object of the present invention to provide an improved reproducing and recording device which achieves the desired results discussed above.

It is another object of the present invention to provide a reproducing and recording device in which corrections for spread, elevational and weathering effects are introduced during the reproducing and recording operation but which avoids movement of the reproducing heads to make the desired corrections.

Another object of the present invention resides in the provision of a reproducing and recording device wherein a plurality of signal traces recorded on a reproducible record are sequentially reproduced and re-recorded on a permanent medium after appropriate phase corrections have been introduced for the elevational, weathering and spread effects for each trace.

It is another object of the present invention to provide a reproducing and recording device in which a plurality of signal traces recorded on a reproducible record and uncorrected for elevational, weathering and spread effects are reproduced and re-recorded on a single medium after introducing suitable time corrections to compensate for these effects.

A still further object of the present invention resides in the provision of a reproducing and recording device of the character described wherein there is employed a differential gearing operated automatically to introduce time corrections corresponding to the elevational, weathering and spread effects as the signal traces are sequentially reproduced and re-recorded.

The above and other objects are achieved in accordance with the present invention by the provision of apparatus for reproducing from a reproducible record signals stored in the form of a plurality of side-by-side signal traces. The stored signals, as previously indicated, correspond to vibrations detected by a plurality of colinear, spaced apart seismometers in response to the arrival of elastic wave energy generated from a shot point aligned with the seismometer array. In accordance with the present invention, the several signal traces are sequentially reproduced and are then recorded as seismic traces on a permanent record medium and, between the reproducing and re-recording operations, the signals reproduced from each trace are time corrected by an amount corresponding to the elevational, weathering and spread effects by means of a time displacement device which functions to relatively displace the reproducible record and the permanent record medium prior to the re-recording operation. The time displacement device is operated under the control of an adjustment means which is adapted to be manually preset in order to introduce to each trace a time correction corresponding to computed elevational, weathering and spread effects peculiar to that particular trace. A control circuit operable in response to rotation of the permanent record medium renders the adjustment means effective to introduce the proper correction to each of the sequentially reproduced traces and at the same time controls the recording mechanism associated with the record medium in such manner that the sequentially reproduced traces are re-recorded on the permanent record medium. Thus, for each revolution of the permanent record medium, one of the signal traces is reproduced from the reproducible record, a time displacement is introduced between the medium and the reproducible record to effect the elevational, weathering and spread corrections, and the corrected signals are then re-recorded as a seismic trace in side-by-side relation with other re-recorded traces, thereby presenting a cross section which is representative of a geological profile of a portion of the subsurface functions.

The invention, both as to its organization and method of operation, together with further objects and advantages thereof, will best be understood by reference to the specification taken in connection with the accompanying drawings in which.

Figure 1:
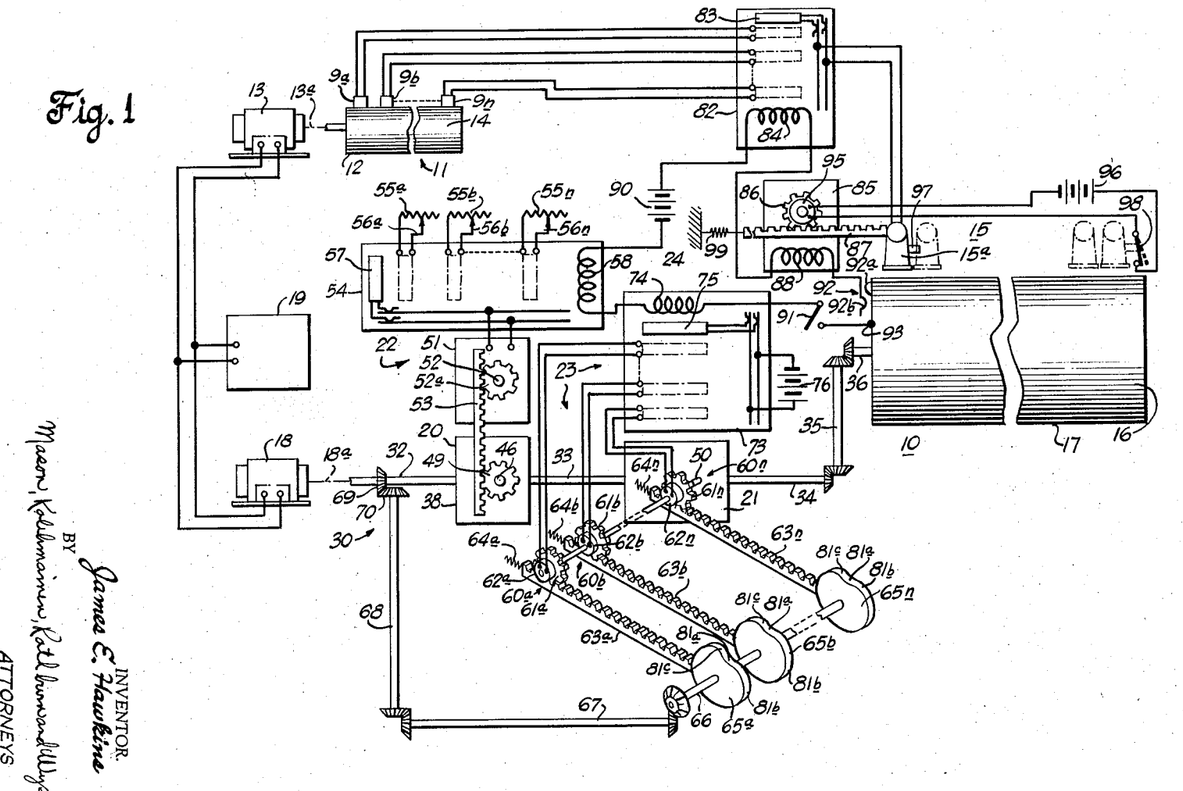
Fig. 1 is a partially schematic, partially diagrammatic view of a reproducing and recording device characterized by the features of the present invention.

Referring now to the drawings, and particularly to Fig. 1 thereof, there is illustrated a reproducing and recording device indicated generally at 10 and embodying the features of the present invention. The device 10 includes a reproducing unit identified by reference numeral 11 and comprising a play-back drum 12 driven by a synchronous motor 13 through a suitable mechanical connection which is represented by broken line 13a and which may include suitable reduction gearing for the purpose of driving the drum 12 at relatively slow speed. A reproducible record or magnetic tape 14 is wrapped about the drum 12 and is detachably secured thereto by any conventional structure, as, for example, by the construction shown in co-pending application Serial No. 612,779 of James E. Hawkins, Robert W. Baltosser and Sidney W. Schoellhorn, filed September 28, 1956 and assigned to the same assignee as the present invention.

Recorded on the magnetic tape 14 are a plurality of signal traces corresponding to the elastic wave vibrations generated from a single shot point and detected by a plurality of spaced apart colinear seismometers with each trace representing the energy arriving at one of the seismometers. The record 14 underlies a plurality of spaced apart reproducing heads $9a$, $9b$, . . . $9n$, there being one such head for each of the signal traces appearing upon the record 14.

Briefly, the signal traces on the magnetic tape 14 are played back simultaneously but are transmitted one at a time and in sequence to a recording unit 15 including a light beam deflecting galvonometer or the like (not shown). At the unit 15 each reproduced signal trace is employed to produce a corresponding seismic trace upon a permanent record medium 16 which may comprise a light-sensitive material. The seismic trace produced may be either of the variable area type in which case the reproduced signals are used to vary or control the intensity of the light beam by modulating a glow lamp or the like or, alternatively, this trace may be of the variable amplitude or variable area type wherein the reproduced signals excite a galvanometer coil or the like to control the deflection of a light beam impinging upon the light-sensitive medium 16. In either case, the medium 16 is mounted upon a recording drum 17 by any conventional mechanism such as that shown in the above-identified Hawkins et al. application Serial No. 612,779 and is rotated past the light beam. To effect this rotation a synchronous motor 18, which is identical to the synchronous motor 13 previously described, is employed to drive the drum 17 through a drive mechanism indicated generally as 30. The latter drive mechanism may include appropriate reduction gearing (not shown) in order to drive the record medium 16 at a speed which will effect faithful recording of the signals supplied to the unit 15. In order to correlate the rotations of the reproducible record 14 and the medium 16, the motors 13 and 18 are synchronized by highly stable excitation signals supplied from a common speed control source indicated generally at 19. The source 19 may be of any suitable type but preferably includes a vibrating reed or tuning fork for the purpose of stabilizing the synchronizing signals supplied to the motors 13 and 18 so that the output shafts of these motors are driven at the same speed.

The relative angular or time positions of the record 14 and the medium 16 are changed prior to the recording of each seismic trace upon the medium 16 by an amount corresponding to the required elevational, weathering and spread effect corrections. The elevational and weathering effect corrections, which are usually referred to as static corrections, are introduced by a first differential gearing 20 connected in the drive mechanism 30 while the spread effect correction, which is generally termed a dynamic correction, is supplied by a second differential gearing 21. The time correction introduced to each trace by the gearing 20 is controlled by a first manually settable adjustment device indicated generally at 22 while the time correction supplied by the gearing 21 is controlled by a second adjustment device 23. Prior to the reproduction of any of the signal traces from the record 14, the adjustment device 22 is preset in accordance with the above-described elevational and weathering effect corrections and the device 23 is preset in accordance with the spread effect corrections, both of these corrections being computed from data accumulated during the survey. A control circuit indicated generally at 24 is energized in response to rotation of the medium 16 to render the adjustment devices 22 and 23 effective to actuate the gearings 20 and 21 prior to the reproduction of each signal trace from the record 14, thereby to introduce between the tape 14 and the medium 16 a selected angular or time displacement which is proportional to the time correction required for each trace.

More specifically, the drive mechanism 30 for the medium 16 comprises the synchronous motor 18 which, as indicated by broken line 18a, is connected to drive the input shaft 32 of the differential gearing 20. In turn, the output shaft 33 of the gearing 20 drives an input gear of the differential gearing 21, the output shaft 34 of which, through connecting shafts 35 and 36, rotatably drives the recording drum 17. Suitable gears are, of course, employed to transmit the drive from the shaft 34 to the shaft 35 and from the latter shaft to the shaft 36.

Figure 2:
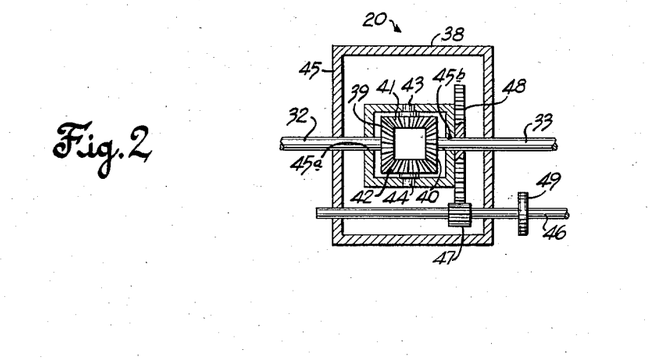
Fig. 2 is a fragmentary, elevational view shown primarily in section, and illustrating a differential gearing employed in the device of Fig. 1.

The differential gearings 20 and 21 are identical in construction and are of the general type disclosed in the above-identified copending Hawkins et al. application Serial No. 612,779. In view of the foregoing description it will be observed that the gearings 20 and 21 are serially connected in the drive mechanism 30 and, hence, each may be employed to introduce the aforementioned displacements between the permanent record medium 16 and the magnetic tape 14. As shown, the differential gearing 20 is varied by the adjustment device 22 to adjust, in a manner described hereinafter, the angular relationship existing between its input shaft 32 and its output shaft 33, both of which are suitably journaled in a gear housing 38, as best shown in Fig. 2. Splined to the inwardly disposed ends of the shafts 32 and 33 are bevel gears 39 and 40, respectively, and these gears each mesh with another pair of bevel gears 41 and 42 extending perpendicularly to the gears 39 and 40, respectively, thereby to provide a power path from the synchronous motor 18 to the shaft 33. The gears 41 and 42 are fixedly secured to studs 43 and 44, respectively, which are journaled in a cage 45. Apertures 45a and 45b in the cage 45 accommodate the shafts 32 and 33 and are dimensioned to permit relative rotation of the cage about these shafts.

In order to control rotation of the cage 45, a control shaft 46 is journaled in the housing 38 and is in driving engagement through a spur gear 47 with another spur gear 48 attached to the cage 45 by any suitable means. Rotation of the shaft 46 is accomplished under the control of the adjustment device 22, the output of which is in driving engagement with a spur gear 49 splined or otherwise secured to the shaft 46. When the shaft 46 is rotated to turn the cage 45, the bevel gears 41 and 42 are rotated about the drive axis of the bevel gears 39 and 40 to induce a relative angular displacement between the input shaft 32 and the output shaft 33. This relative displacement is not accompanied by a change in velocity due to the fact that the bevel gears are constantly in mesh, but a temporary acceleration or deceleration is experienced to achieve the desired angular or time displacement.

In similar manner, in order to introduce the dynamic or spread effect corrections, the differential gearing 21 is provided with a control shaft 50 which is rotated under the control of the adjustment device 23 described hereinafter in greater detail. Obviously, when the control shaft 50 is rotated a relative angular or time displacement is introduced between the shaft 33 and the output shaft 34.

Since the synchronous motors 13 and 18 are excited from a common source 19 to rotate their output shafts at the same speed, the magnetic tape 14 and the permanent record 16 are rotated in unison and at the same speed when the motors 13 and 18 are both energized. However, if either of the differential gearings 20 or 21 is actuated by its associated adjustment device, a relative angular displacement is introduced between the shafts 32 and 34 with the result that a corresponding time displacement is produced between the record 14 and the medium 16.

As previously mentioned, data is compiled during the geophysical exploration from which the required elevational and weathering phase corrections may be computed for each of the signal traces stored on the magnetic tape 14. Generally, the elevational and weathering effects are combined and a single correction is made to compensate for both of these effects. To this end, the adjustment device 22 is employed to rotate the shaft 46 of the differential gearing 20 by an amount which is proportional to the compensation required for each of the signal traces prior to the reproduction of that trace. Specifically, the adjustment device 22 comprises a servo amplifier and motor system 51 including a polarity-responsive motor (not shown) operated under the control of polarized signals supplied from a servo amplifier circuit (not shown). The motor is effective to drive an output shaft 52 carrying a gear 52a which is in driving engagement with a longitudinally movable rack 53. The latter rack, in turn, meshes with and drives the spur gear 49 of the gearing 20 in order to complete the drive from the adjustment device 22 to the gearing 20. It will thus be observed that excitation of the servo motor causes the differential gearing 20 to introduce an angular displacement between the shafts 32 and 33, as explained above.

The polarity-responsive motor is controlled by the servo amplifier circuit which includes a bank of variable resistors 55a, 55b, . . . 55n which are calibrated in terms of time and are selectively connected into the servo amplifier circuit by a stepping relay 54 operated by the control circuit 24. One such resistor is provided for each of the signal traces recorded upon the tape 14. Prior to initiation of the operation of the unit 10, these resistors are manually preset by adjustment of their wipers 56a, 56b, . . . 56n in accordance with the desired elevational and weathering effect corrections for each signal trace. Thus, resistor 55a is adjusted to correspond to the elevational and weathering corrections for the first trace to be reproduced from the tape 14, the resistor 55b is adjusted to correspond to the elevational and weathering corrections for the second trace to be reproduced and so on. During reproduction the stepping relay 54 is effective to connect each resistor in sequence into the servo amplifier circuit, so that as each signal trace is reproduced, the gearing 20 is actuated to introduce the proper time correction or angular displacement between shafts 32 and 33 to compensate for the elevational and weathering effects. To make the described connections, the stepping relay 54 includes an armature connector 57 which is adapted to be moved from the neutral position shown in Fig. 1 into successive operative positions shown in dotted lines in engagement with one of the variable resistors 55a, 55b, . . . 55n in response to energization of its operating coil 58 by the control circuit 24. As each of the resistors is connected into the servo amplifier circuit an error signal is developed for driving the servo motor. Specifically, when a resistance of different magnitude is introduced into the servo amplifier circuit 51 the balance of the circuit is disturbed with the result that a polarized error signal is applied to the polarity-responsive motor in order to drive the latter in the proper direction to restore the circuit balance. The amount of rotation of the output shaft of the motor is, of course, determined by the amplitude of the input signal and, as a consequence, the motor shaft is driven to a position corresponding to the setting of the particular variable resistor 55a, 55b, . . . or 55n which is connected in the input circuit. Therefore, it will be recognized that successive energization of the stepping relay 54 by the control circuit 24 to effect successive connection of different ones of the variable resistors into the input of the servo amplifier circuit induces the servo motor successively to actuate the differential gearing 20 by predetermined amounts in order to introduce for each signal trace successively reproduced from the tape 14 an angular phase displacement between the magnetic tape 14 and the permanent medium 16, thereby to make the static corrections required for each trace.

During the conduct of a conventional seismic survey, the distances between the shot point and each of the seismometers in the detecting array are either known or can be measured and the velocity of propagation in the subsurface formations can usually be estimated or determined and from this data the dynamic time correction required for each of the signal traces appearing on the tape 14 can be computed. Specifically, if the horizontal distance between detectors and the velocity of propagation of the signals are both known the time difference between the arrival of corresponding signals at the detectors can be determined by dividing the distance by the velocity. Information concerning this time difference for each trace is then set into the adjustment device 23 which, in turn, adjusts the differential gearing 21 to introduce the dynamic corrections. Specifically, the control shaft 50 of the gearing 21 is selectively rotated under the control of the adjustment device 23 and this shaft is of such length as to accommodate a plurality of longitudinally spaced pinion assemblies 60a, 60b, ... 60n, there being one such assembly for each of the traces stored on the tape 14. The pinion assemblies include a plurality of pinions 61a, 61b, ... 61n which may be respectively connected to the control shaft 50 by means of magnetic clutches 62a, 62b, ... 62n which are rendered operative one at a time and in sequence under the control of a stepping relay 73. In order to rotate the control shaft 50 when one of the magnetic clutches is energized, the pinions 61a, 61b, ... 61n are individually driven by a plurality of elongated racks 63a, 63b, ... 63n respectively, which are respectively biased by a plurality of springs 64a, 64b, ... 64n into abutting engagement with a plurality of rotatable cams 65a, 65b, ... 65n, respectively. Each of the latter cams, as described hereinafter, has a configuration corresponding to the dynamic correction for one of the signal traces stored on the tape 14. The proper cams are thus selected prior to reproduction of the record 14 and are then assembled into the adjustment means 23. More particularly, the cams are detachably secured in spaced apart positions upon a shaft 66 which is driven by shaft linkages 67 and 68, the shaft 68 being driven from the shaft 32 through meshing bevel gears 69 and 70. Similar gearing is employed to connect the shaft 68 to the shaft 67 and to connect the latter shaft to shaft 66. By this described construction longitudinal displacement of each of the racks 63a, 63b, ... 63n is simultaneously effected by rotation of the cams 65a, 65b, ... 65n when the motor 18 is energized. As a result, each of the pinions 61a, 61b, ... 61n is simultaneously rotated. However, since each of the latter pinions is connected to the control shaft 50 only when its associated magnetic clutch is energized, no rotation of the control shaft 50 is produced unless one of the clutches is so energized.

The stepping relay 73 is similar to the relay 54 previously described and includes an operating winding 74 energized periodically by the control circuit 24. The winding 74 when energized moves an armature connector 75 from its neutral position shown in Fig. 1 into successive operating positions indicated by the dotted lines. In the first operating position the armature 75 connects the magnetic clutch 62a with a battery 76 in order to energize the clutch and connect pinion 61a to the control shaft 50, thereby inducing the differential gearing 21 to introduce between the shafts 33 and 34 an angular displacement which is a function of the configuration of the cam 65a. In the second operating position of armature 75 the battery 76 supplies energizing current to the clutch 63b, thereby to connect pinion 61b to the shaft 50 in order to induce the differential gearing 21 to introduce a displacement which is a function of the shape of cam 65b. This operation continues until the armature 75 has been moved through all of its operating positions and is returned to the neutral position.

The cams are selected to cause the gearing 21 to introduce a displacement equal to the dynamic correction, which as indicated above is attributed to the seismometer array spacing and the different velocities of propagation of the subsurface formations encountered by the elastic wave energy. Specifically, each of the cams includes a dwell portion 81a having a reference-minimum radius, a camming portion 81b having a variable radius, and a rise portion 81c interconnecting the dwell and camming portions. The radius difference between the dwell portion 81a and the front of the camming portion 81b effects a displacement to compensate for the spacing of the respective seismometers and the radius difference existing throughout the entire camming portion 81b effects a displacement to compensate for the variations in the velocities of propagation. More particularly, the longitudinal movement imparted to the cam follower racks 63 as the racks 63 move from the dwelled portions 81a to the front of the camming portions 81b over the rise portions 81c may be termed the initial dynamic correction while the movement imparted to the racks 63 when the racks 63 ride over the entire camming portions may be termed the continuous dynamic correction. Thus, initially prior to a recording operation, a displacement corresponding to the seismometer spacing is obtained and thereafter throughout a recording of a seismic trace a variable displacement corresponding to the velocities of propagation is continuously introduced. The cams are keyed or otherwise affixed to the shaft 66 in such manner that the dwell portions 81a are aligned and, hence, these dwell portions may be said to be zeroed or time related with the start of the magnetic tape 14 with the result that all of the elongated racks are in abutting engagement with the dwell portions 81a just prior to the reproduction of each signal trace from the tape 14. At this movement, i. e., when the end of the racks rest within the dwell portions 81a, the control circuit 24 operates the stepping relay 73 to energize one of the magnetic clutches in the manner previously described. As the shaft 66 is rotated the racks ride up the rise portions 81c and over the camming portions 81b and are displaced longitudinally in a variable manner, whereby the control shaft 50 is likewise rotated in a variable manner through an energized magnetic clutch and its associated pinion. Thus, the differential gearing 21 is activated and the dynamic trace correction described above is introduced in the drive mechanism 30.

The signals picked up by the reproducing heads 9a, 9b, ... 9n are supplied to the recording unit 15 through a stepping relay 82 which functions to connect the recording head 15a of the unit 15 in sequence to the reproducing heads 9a, 9b, ... 9n. As illustrated, all of the signal traces stored on the tape 14 are simultaneously reproduced by the recording heads 9a, 9b, ... 9n as the reproducing drum 12 is rotated while the relay 82 is effective to connect the output of only one of the heads to the recording device 15. However, reproduction could also be effected by using only a single reproducing head associated with the tape 14 and by moving this head into different laterally displaced positions across the tape by means of a stepping relay or the like which is rendered effective in synchronism with the rotation of the drum 12 so that the head is moved from one signal trace to the adjacent signal trace following each completed revolution of the drum 12. In the apparatus illustrated in Fig. 1 the stepping relay 82 is rendered sequentially operative by the control circuit 24 to determine which of the reproducing heads 9a, 9b, ... 9n is to be connected to the recording head 15a. The stepping relay comprises an armature connector 83 adapted to be moved from the neutral position shown in Fig. 1 into successive operating positions, illustrated in dotted lines, in response to periodic energization of a winding or operating coil 84 by the control circuit 24. As the armature connector is stepped into its successive positions, the different signal traces are reproduced by the heads 9a, 9b, . . . 9n and transmitted in sequence to the recording device 15 where they are re-recorded as side-by-side seismic traces on the permanent medium 16.

As indicated above, the recording device 15 may be effective to produce variable amplitude traces, in which case the signals passed by relay 82 excite a galvanometer for deflecting a light beam laterally of the medium in response to variations in amplitude of the reproduced signals or, alternatively, the device 15 may develop variable density traces in which the intensity of a light beam created by a glow lamp or the like is varied in proportion to amplitude variations of the reproduced signal. Regardless of the type of recording device 15 utilized, the head 15a is moved into successive positions displaced laterally of the medium 16 as indicated by the dotted lines. Each of these positions may be termed a recording position since the head 15a in each position is adapted to produce upon the medium 16 a seismic trace corresponding to one of the signal traces reproduced from the tape 14. To effect the described displacement of the head 15a, a stepping motor 85 including an armature shaft carrying a pinion 86 is employed to drive a rack 87 to which is secured the recording head 15a. Rotation of the motor 85 is controlled by the circuit 24 which periodically supplies energizing current to an operating winding 88 in order to effect the stepping action of the motor. As the motor is successively energized, the rack 87 is moved longitudinally so that the recording head 15a occupies the different recording positions described above. In order to return the rack 87 and the recording head 15a from its last recording position to its neutral position without producing a double trace, clutch means 95 are provided to selectively disconnect the pinion 86 from the output shaft of the stepping motor 85. The clutch means 95 is normally energized by a battery 96, but is deenergized in response to movement of the rack 87 beyond the twenty-fourth recording position where a lug 97 secured to the rack 87 engages a normally closed microswitch 98 (shown in full lines). The microswitch is serially connected to the battery 96 and the clutch means 95 such that when the switch 98 is opened by the lug 97 (as shown in dotted lines) the energization circuit for the clutch means 95 is opened. Incident to deenergization of the clutch means 95 and disengagement of the rack 87 from the stepping motor 85, spring biasing means 99 move the rack 87 and recording head 15a back to their neutral position. The return movement is effected when the recording head overlies the space between the ends of the permanent medium 16 which are secured to the drum 17, thereby to avoid producing a line extending transversely of the previously recorded seismic traces.

As indicated previously, control circuit 24 functions to initiate and terminate the operation of the reproducing and recording device 10 and to control the operation of the various motors and relays described above and, to this end, it includes a battery 90 serially connected with a manually operated on-off switch 91 and an automatically operated switch 92. The switch 92 includes a contact 92a secured to and extending axially from the drum 17 and a stationary contact 92b which is engaged by the contact 92a once during each revolution of the drum 17 to complete a circuit from the on-off switch 91 through connector 93 and through switch 92 to winding 88. Thus, when switches 91 and 92 are both closed, one side of the battery 90 supplies energizing current to each of the operating windings 74, 58, 84 and 88 to operate the stepping relays 73, 54 and 82 and the stepping motor 85. The relays 73, 54 and 82 and the motor 85 are thus advanced one step with the results described above. When contact 92a is moved out of engagement with contact 92b by continued rotation of the drum 17, the energizing circuit for windings 74, 58, 84 and 88 is broken.

In operation, the magnetic tape 14 is mounted upon the drum 12 of the playback unit 11. Time corrections corresponding to such static corrections as the weathering and elevational effects are introduced for each of the signal traces stored on the record 14 by manually adjusting the time calibrated resistors 55a, 55b, . . . 55n. Appropriate cams are attached to the shaft 66 and aligned thereon by use of suitable indexing means or keys. In one application of the present invention twenty-four trace reproducible records are employed, and, accordingly, a corresponding number of resistors and cams are used. In this application stepping relays and a stepping motor having armatures movable into twenty-four different operating positions are used. In any event, the armature connectors 75, 57 and 83 of the stepping relays 73, 54 and 82 and the armature unit of the stepping motor 85 are all initially positioned in their neutral positions and the racks 63a, 63b, . . . 63n are seated within the dwell portions 81a of their associated cams. The permanent record 16 is mounted upon the drum 17 and the reproducing head 15a is positioned adjacent one edge of the permanent record 16 in its neutral position, as shown. It will be appreciated that all of the aforementioned steps are performed prior to initiating the reproducing and re-recording operation.

Once the preliminary steps described above have been completed, the speed control source 19 is energized by suitable switch means (not shown) to drive the synchronous motors 13 and 18, whereupon both the playback drum 12 and the recording drum 17 are rotated at a constant angular velocity. In order to initiate a reproducing and recording operation, the manually operated switch 91 of the control circuit 24 is closed. The actual reproduction of the first signal trace does not begin, however, until the switch 92 is closed by the rotation of the drum 17 through a portion which may be termed the "start" position. Incident to the closing of the switch 92, current provided by the battery 90 flows through each of the operating windings 74, 58, 84 and 88 to operate simultaneously the stepping relays 73, 54 and 82 and stepping motor 85 to advance each of the latter devices one step. Operation of the stepping motor 85 advances the recording head 15a from its neutral position into its first recording position. When the relay 82 is advanced, its armature connector moves from the neutral position into the first operating position, thereby to connect electrically the first reproducing head 9a and the recording head 15a. However, no trace is recorded immediately since the contacts of switch 92 are positioned to permit operation of the differential gearings 20 and 21 prior to movement of the first signal trace on the tape 14 into a position beneath the reproducing head 9a. A slight time interval therefore exists between the closing of switch 92 and the application of signals to the recording head 15a and during this interval the static and initial dynamic corrections are introduced. Specifically, energization of the winding 58 when switch 92 is closed immediately moves the armature connector of the stepping relay 54 from its neutral position to its first operating position to connect the resistor 55a into the servo amplifier circuit, thereby to operate the servo motor and introduce the static correction in the manner previously described. In addition, energization of the winding 74 moves the armature connector of the stepping relay 73 from its neutral position into its first operating position to energize the magnetic clutch 62a, whereby the pinion assembly 60a is connected to the control shaft 50. The rack 63a is then moved under the control of the cam 65a to rotate the control shaft 50 so that the gearing 21 introduces an initial correction in the manner previously described.

After time displacements corresponding to the static and initial dynamic corrections have been introduced between the tape 14 and the medium 16 by the gearings 20 and 21, continued rotation of drum 12 moves the initial portion of the first signal trace recorded on the magnetic tape 14 to a position beneath the reproducing head 9a with the result that signals are supplied to the recording head 15a. As the drum 12 moves the tape 14 past the reproducing head 9a, the drum 17 moves the medium 16 past the recording head 15a so that a seismic trace is created on the medium 16. Throughout the entire revolution of the drums 12 and 17, the gearing means 21 is operated under the control of the cam 65a to introduce the continuous dynamic correction which varies as described above. Hence, a seismic trace is produced on the medium 16, corresponding to the reproduced signal traces but adjusted with respect to time in order to effect the described static and dynamic corrections. When the contacts 92a and 92b of the switch 92 are disengaged by continued rotation of the drum 17, the control circuit 24 is interrupted with the result that the operating windings 74, 58, 84 and 88 are all de-energized. The deenergization of these windings does not disturb the stepping relays or motor since, by the inherent nature of these devices, they operate only when energized.

It will be understood that one complete revolution of the drums 12 and 17 results in reproduction of the first signal trace and re-recording of a corresponding seismic trace upon the permanent medium 16. At the completion of one revolution of the drum 17 from its "start" position the trailing or final portion of the first signal trace on the tape 14 has been moved past the reproducing head 9a and the switch 92 is again closed with the result that each of the operating windings 74, 58, 84 and 88 are again energized. Incident to energization of these windings, the recording head 15a is moved to its second recording position, the stepping relay 82 electrically connects the reproducing head 9b with the recording head 15a, the stepping relay 54 disconnects the resistor 55a from the circuit 51 and connects the resistor 55b into this circuit, whereupon a new error signal is applied to the servo motor and a new time displacement obtained in accordance with the static correction to be introduced for the second signal trace on the tape 14, and the stepping relay 73 deenergizes the magnetic clutch 62a and energizes the magnetic clutch 62b such that the control shaft 50 is rotated in accordance with the configuration of the cam 65b by an amount corresponding to the dynamic correction required for the second signal trace reproduced from tape 14. Once again the time relationship existing between the medium 16 and the record 14 is adjusted to introduce the above-described static and dynamic corrections. As the magnetic tape passes beneath the reproducing head 9b, the second signal trace is reproduced and transmitted to the recording head 15a where it is re-recorded as a seismic trace on the permanent medium 16. The reproducing and re-recording operation is continued automatically and the stepping relays and motor 73, 54, 82 and 85 are operated under the control of the switch 92 once during each revolution of the drum 17.

In order to terminate the reproducing and re-recording operation after the last trace has been recorded, that is, after the drum 17 has completed its twenty-fourth operative revolution and when the switch 92 has been closed for the twenty-fifth time, the stepping relays and motor 73, 54, 82 and 85 are each automatically operated with the result that the connector of each relay is advanced from its twenty-fourth position into its neutral position and the rack 87 is moved back to its neutral position under the control of the spring biasing means 99. The switch 91 may be opened after the recording head has been returned to its non-recording position and the drum 17 may then continue to rotate without producing additional seismic traces or impairing those traces previously recorded. The equipment is shut down by turning off the synchronous motors 13 and 18. It will be appreciated, however, that the rotation of the drums 12 and 17 could be terminated automatically by a switch actuated in response to movement of the recording head 15a back to its neutral or non-recording position.

Figure 3:
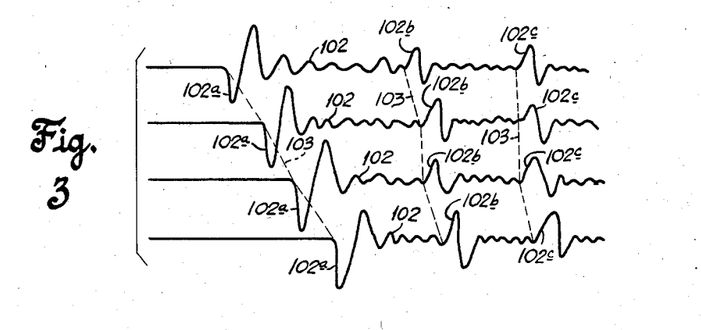
Fig. 3 is a view of a permanent record medium on which is depicted a plurality of seismic traces representative of the seismic signals developed by a seismometer array, shown before correction has been made for the elevational, weathering and spread effects.
Figure 4:
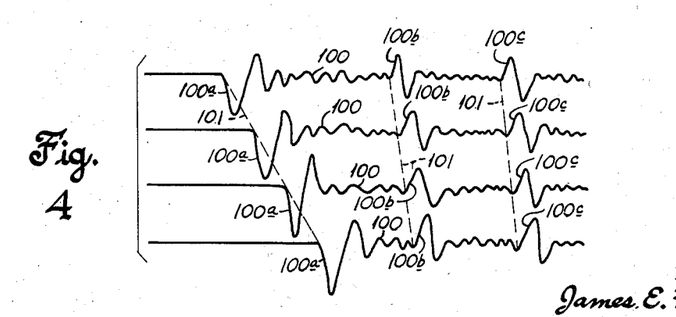
Fig. 4 is a view of a permanent record medium on which is depicted a plurality of seismic traces representative of the seismic signals developed by a seismometer array, shown after correction has been made for elevational, weathering and spread effects by the device of Fig. 1.

By use of the apparatus described above, the seismic traces 100 on the permanent medium 16 (as shown in Fig. 4) correspond to the stored signal traces on the magnetic tape 14 but are corrected for the weathering, elevational and spread effects to facilitate analysis. More particularly, the reflections 100a obtained from the most shallow subsurface interface are identified by the high amplitude portions of the seismic traces 100 and, for emphasis, these reflections have been interconnected by a dotted line 101 which is representative of the disposition of this shallow interface. In a similar manner, the reflections 100b and 100c obtained from the second and succeeding subsurface interfaces have been interconnected by dotted line 101 to represent the profiles of these interfaces. By contrast, if the signal traces on the tape 14 had been directly recorded on the medium 16 without any time adjustment for the weathering, elevational and spread effects, seismic traces 102 (Fig. 3) would have been produced, with the result that if the respective reflections 102a, 102b and 102c had been interconnected, inaccurate interfaces 103 would have been identified.

It will be understood that the medium 16 and drum 17 may be modified to accommodate more than the number of seismic traces corresponding to the number of signal traces recorded on a single magnetic tape, for example, 48 or 96 seismic traces. Moreover, the rack 87 may be modified so that it may be moved into a number of operative recording positions corresponding to the number of seismic traces desired to be recorded on the modified permanent medium. Hence, magnetic tapes may be successively mounted on the playback drum 16 and each may be brought into relative time alignment with the seismic traces recorded on the medium 16. To this end, a phase relating device of the type disclosed and claimed in the above-identified Hawkins application could be used. Regardless of the device employed, once the seismic signals on the second magnetic tape have been time correlated with the seismic traces on the medium 16, the above-described reproducing and recording operation may then be repeated after the resistors 55a, 55b, . . . 55n and the cams 65a, 65b, . . . 65n have been preset and preselected in accordance with the necessary weathering, elevational and spread effect corrections for the second group of reproducible signal traces on the second magnetic tape 14.

Although the medium 16 has been referred to as a permanent type of record comprising a light-sensitive material, it will be understood that the medium may be of the reproducible or magnetic type. In this connection, instead of using a light galvanometer recording head 15a, a conventional magnetic transducer head should be employed. Thus, if a magnetic tape is used on the recording drum 17, a plurality of seismic signals will be re-recorded on the magnetic tape in conventional side-by-side relation but corrected in time to compensate for the dynamic and static corrections, whereby at a later date the magnetic tape may be used to produce seismic traces on a permanent medium.

While a particular embodiment of the invention has been shown, it will be understood, of course, that the invention is not limited thereto since many modifications may be made and it is therefore contemplated by the appended claims to cover any such modifications as fall within the true spirit and scope of the invention.

What is claimed as new and desired to be secured by Letters Patent of the United States is:

1. A seismic reproducing and recording device for use with a reproducible record comprising means for reproducing signals stored upon said reproducible record, means for re-recording upon a record medium a trace corresponding to the reproduced signals, and means for relatively displacing said medium and said reproducible record with respect to time prior to the re-recording in order to introduce static and dynamic time corrections.

2. A seismic reproducing and recording device for use with a reproducible record comprising means for reproducing signals stored upon said reproducible record, means for re-recording upon a record medium a trace corresponding to the reproduced signals, synchronous drive mechanisms for rotating both said medium and said reproducible record, and means in one of the drive mechanisms for effectively altering the relative time relationship existing between said record and said medium in order to introduce static and dynamic time corrections.

3. A seismic reproducing and recording device for use with a reproducible record comprising means for reproducing signals stored upon said reproducible record, means for re-recording upon a record medium a trace corresponding to the reproduced signals, synchronous drive mechanisms for rotating both said medium and said reproducible record, differential gearing means including in one of the drive mechanisms for effecting a relative time change between said record and said medium, and means for controlling the operation of said differential gearing means to introduce the desired static and dynamic corrections.

4. A device for reproducing from a reproducible record signal traces uncorrected for elevational, weathering and spread effects and for re-recording the reproduced signal traces sequentially on a single medium as a plurality of seismic traces corrected for elevational, weathering and spread effects, comprising means for reproducing said signal traces from said record, means for re-recording said reproduced signal traces one at a time on said medium as seismic traces, means for relatively time displacing said medium and said record prior to reproducing and re-recording each signal trace in order to introduce desired elevational, weathering and spread effect time corrections.

5. A device for reproducing from a reproducible record signal traces uncorrected for elevational, weathering and spread effects and for re-recording the reproduced signal traces sequentially on a single medium as a plurality of seismic traces corrected for elevational, weathering and spread effects, comprising means for reproducing said signal traces from said record, means for sequentially re-recording said reproduced signal traces on said medium as seismic traces in side-by-side relation, means for relatively time displacing said medium and said record in accordance with the elevational, weathering and spread effect time correction for each signal trace, and means for automatically controlling the operation of said displacing means prior to reproducing and re-recording of each signal trace.

6. A device for reproducing from a reproducible record signal traces uncorrected for static and dynamic effects and for re-recording the reproduced signal traces sequentially on a single medium as a plurality of seismic traces corrected for static and dynamic effects, comprising means for reproducing said signal traces from said record, means for sequentially re-recording said reproduced signal traces on said medium as seismic traces, drive mechanism for rotating said medium and said record, means in said drive mechanism for relatively displacing said medium and said record to introduce for each signal trace a time correction to compensate for said effects, means for storing time correction data pertaining to each signal trace, means including said storing means for operating said displacing means prior to reproducing and re-recording of each signal trace, and means operated in synchronism with the drive mechanism for automatically controlling said operating means.

7. A device for reproducing from a reproducible record signal traces uncorrected for elevational, weathering and spread effects and for re-recording the reproduced signal traces sequentially on a single medium as a plurality of seismic traces corrected for elevational, weathering and spread effects, comprising means for reproducing said signal traces from said record, means for sequentially re-recording said reproduced signal traces on said medium as seismic traces corresponding in amplitude variation to said signal traces, means for synchronously driving said medium and said record, and means including adjustable differential gearing included in said drive means for relatively angularly displacing said medium and said record to introduce for each successively reproduced and re-recorded signal trace a time correction to compensate for said effects.

8. In a device for reproducing from a reproducible record signal traces uncorrected for elevational, weathering and spread effects and for re-recording the reproduced signal traces sequentially on a single medium as a plurality of seismic traces corrected for elevational, weathering and spread effects, means adapted to be preset corresponding to the respective elevational, weathering and spread time displacements for said signal traces, means operable in response to said first-named means for relatively time displacing said medium and record prior to the reproducing and re-recording of said seismic traces, and circuit means including means operable by said medium for operating said first-named means.

9. A device for reproducing from a reproducible record signal traces uncorrected for elevational, weathering and spread effects and for re-recording the reproduced signal traces sequentially on a single medium as a plurality of seismic traces corrected for elevational, weathering and spread effects, comprising means for reproducing from said record a plurality of signal traces each corresponding to the elastic wave energy arriving at a plurality of spaced apart seismometers, means for sequentially re-recording said reproduced seismic signals on said medium as seismic traces, first means for relatively time displacing said medium and said record prior to the reproducing and re-recording of each signal trace in order to compensate for the horizontal spaced apart positions of said seismometers, and second means for relatively time displacing said medium and said record prior to the reproducing and re-recording of each signal trace in order to compensate for the dissimilar velocity of propagation of said wave energy through strata adjacent the earth's surface and in order to relate all of the signals to a common time reference.

10. A device for reproducing from a reproducible record signal traces uncorrected for elevational, weathering and spread effects and for re-recording the reproduced signal traces sequentially on a single medium as a plurality of seismic traces corrected for elevational, weathering and spread effects, comprising means for reproducing said signal traces from said record, means for sequentially re-recording said reproduced signal traces on said medium as seismic traces corresponding in amplitude variation to said signal traces, means for synchronously driving said medium and said record, a first and second differential gearing included in said driving means for relatively angularly displacing said medium and said record, a first and second adjustment means respectively connected to said first and second differential gearing for effecting said relative angular displacement prior to the reproducing and re-recording of each seismic trace, and means operable to control the operation of said first and second adjustment means.

11. A device for reproducing from a reproducible record signal traces uncorrected for elevational, weathering and spread effects and for re-recording the reproduced signal traces sequentially on a single medium as a plurality of seismic traces corrected for elevational, weathering and spread effects, comprising means for reproducing said signal traces from said record, means for sequentially re-recording said reproduced signal traces on said medium as seismic traces corresponding in amplitude variation to said signal traces, means for synchronously driving said medium and said record, differential gearing included in said driving means for introducing a relative angular displacement between said medium and said record, means connected to said differential gearing for controlling the operation of said differential gearing, and means included in said last-named means adapted to be manually preset in accordance with the desired elevational, weathering and spread effects for each successively reproduced and re-recorded seismic trace.

12. A device for reproducing from a reproducible record signal traces uncorrected for elevational, weathering and spread effects and for re-recording the reproduced signal traces sequentially on a single medium as a plurality of seismic traces corrected for elevational, weathering and spread effects, comprising means for reproducing said signal traces from said record, means for sequentially re-recording said reproduced signal traces on said medium as seismic traces corresponding in amplitude variation to said signal traces, means for synchronously driving said medium and said record, differential gearing included in said driving means for introducing a relative angular displacement between said medium and said record for each successively reproduced signal trace, means connected with said differential gearing and operable to effect a relative angular displacement between said medium and record proportional to the required static and dynamic correction for each sequential reproduced and re-recorded seismic trace, and means adapted to be manually preset to control the operation of said connected means to produce the desired angular displacement between the medium and the record.

13. A device for reproducing from a reproducible record signal traces uncorrected for elevational, weathering and spread effects and for re-recording the reproduced signal traces sequentially on a single medium as a plurality of seismic traces corrected for elevational, weathering and spread effects, comprising means for reproducing said signal traces from said record, means for sequentially re-recording said reproduced signal traces on said medium as seismic traces corresponding in amplitude variation to said signal traces, means for synchronously driving said medium and said record, differential gearing included in said driving means for introducing a relative angular displacement between said medium and said record for each successively reproduced signal trace, means including manually operable means for operating said differential gearing means to effect the necessary angular displacement for each seismic trace, control means for rendering effective said manually operable means, and circuit means for operating said control means to cause angular displacements to be introduced for each seismic trace prior to the reproduction of each signal trace.

14. A device for reproducing from a reproducible record signal traces uncorrected for elevational, weathering and spread effects and for re-recording the reproduced signal traces sequentially on a single medium as a plurality of seismic traces corrected for elevational, weathering and spread effects, comprising means for reproducing said signal traces from said record, means for sequentially re-recording said reproduced signal traces on said medium as seismic traces corresponding in amplitude variation to said signal traces, means for synchronously driving said medium and said record, differential gearing included in said driving means for introducing a relative angular displacement between said medium and said record, means connected to said differential gearing for controlling the operation of said differential gearing, and means including means operable in response to revolution of said medium for operating said controlling means.

References Cited in the file of this patent
UNITED STATES PATENTS

| 2,243,730 | Ellis | May 27, 1941 |
| 2,810,898 | Meiners | Oct. 22, 1957 |

UNITED STATES PATENT OFFICE
CERTIFICATE OF CORRECTION

Patent No. 2,858,523

October 28, 1958

James E. Hawkins

It is hereby certified that error appears in the printed specification of the above numbered patent requiring correction and that the said Letters Patent should read as corrected below.

Column 3, line 37, for "functions" read -- formations --; column 8, line 27, after "spacing" insert -- errors --; line 30, for "propagation is" read -- propogation error is --; line 66, for "completed" read -- complete --; column 13, lines 19 and 20, for "including" read -- included --.

Signed and sealed this 26th day of May 1959.

(SEAL)

Attest:

KARL H. AXLINE
Attesting Officer

ROBERT C. WATSON
Commissioner of Patents